US006436578B2

(12) United States Patent
Turner et al.

(10) Patent No.: US 6,436,578 B2
(45) Date of Patent: Aug. 20, 2002

(54) ELECTRODE COMPOSITIONS WITH HIGH COULOMBIC EFFICIENCIES

(75) Inventors: Robert L. Turner, Woodbury; Donald J. McClure, Shoreview; Larry J. Krause, Stillwater; Mary M. Buckett, Woodbury, all of MN (US); Jeffery R. Dahn, Hubley; Ou Mao, Halifax, both of (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/738,517

(22) Filed: Dec. 15, 2000

Related U.S. Application Data

(62) Division of application No. 09/048,407, filed on Mar. 26, 1998, now Pat. No. 6,203,944.

(51) Int. Cl.[7] ............................................. H01M 4/04
(52) U.S. Cl. ............................... 429/231.95; 252/182.1
(58) Field of Search ..................... 429/231.95, 218.1; 420/425, 427, 429, 430, 557, 560, 589; 252/182.1

(56) References Cited

U.S. PATENT DOCUMENTS

| | | | |
|---|---|---|---|
| 4,011,372 A | 3/1977 | Tomczuk et al. | 429/218 |
| 4,048,395 A | 9/1977 | Lai | 429/112 |
| 4,076,905 A | 2/1978 | Sammells | 429/112 |
| 4,318,969 A | 3/1982 | Peled et al. | 429/105 |
| 4,434,213 A | 2/1984 | Niles et al. | 429/3 |
| 4,436,796 A | 3/1984 | Huggins et al. | 429/112 |
| 4,489,143 A | 12/1984 | Gilbert et al. | 429/103 |
| 4,547,442 A | 10/1985 | Besenhard et al. | 429/209 |
| 4,626,335 A | 12/1986 | Cupp et al. | 204/293 |
| 4,632,889 A | 12/1986 | McManis et al. | 429/218 |
| 4,652,506 A | 3/1987 | Belanger et al. | 429/192 |

(List continued on next page.)

FOREIGN PATENT DOCUMENTS

| | | | |
|---|---|---|---|
| CA | 2134052 | 4/1995 | |
| CA | 2134053 | 4/1995 | |
| CA | 2143388 | 8/1995 | |
| DE | 43 20 140 A1 | 2/1994 | |
| EP | 0 323 888 A | 7/1989 | |
| JP | 61-66369 | 4/1986 | |
| JP | 63-13264 | 1/1988 | |
| JP | 63-141259 | 6/1988 | |
| JP | 6-325764 | 11/1994 | |
| JP | 7-288127 | 10/1995 | |
| JP | 7-296812 | 11/1995 | |
| JP | 7-312219 | 11/1995 | |
| JP | 10-3907 | * 1/1998 | |
| JP | 10-3920 | 1/1998 | |
| JP | 10-302770 | 11/1998 | ............ H01M/4/02 |
| WO | WO 91/00624 | 1/1991 | |
| WO | WO96/3351 | 10/1996 | |

OTHER PUBLICATIONS

Gerasimov et al., "On Mechanism of New Phases Formation During MEchanical Alloying of Ag–Cu, Al–Ge, and Fe–Sn Systems," Mat. Res. Bull. vol. 31, pp. 1297–1305, Oct. 1996.*

Courtney et al., "Electrochemical and In Situ X–Ray Diffraction Studies of the Reaction of Lithium with Tin Oxide Composites", *J. Electrochem. Soc.*, 144(6):2045–2052 (Jun. 1997).

(List continued on next page.)

*Primary Examiner*—Carol Chaney
*Assistant Examiner*—Susy Tsang-Foster
(74) *Attorney, Agent, or Firm*—Dorothy P. Whelan; Lucy C. Weiss

(57) ABSTRACT

An electrode composition that includes (a) an electrochemically active metal element which, prior to cycling, is in the form of an intermetallic compound or an elemental metal and (b) a non-electrochemically active metal element. The electrode compositions have high initial capacities that are retained even after repeated cycling. The electrode compositions also exhibit high coulombic efficiencies.

17 Claims, 10 Drawing Sheets

U.S. PATENT DOCUMENTS

| | | | |
|---|---|---|---|
| 4,758,484 A | 7/1988 | Furukawa et al. | 429/194 |
| 4,820,599 A | 4/1989 | Furukawa et al. | 429/194 |
| 4,851,309 A | 7/1989 | Toyoguchi et al. | 429/194 |
| 4,888,258 A | 12/1989 | Desjardins et al. | 429/194 |
| 4,996,129 A | 2/1991 | Tuck | 429/194 |
| 5,278,005 A | 1/1994 | Yamauchi et al. | 429/194 |
| 5,283,136 A | 2/1994 | Peled et al. | 429/192 |
| 5,294,503 A | 3/1994 | Huang et al. | 429/194 |
| 5,350,647 A | 9/1994 | Hope et al. | 429/218 |
| 5,395,711 A | 3/1995 | Tahara et al. | 429/197 |
| 5,437,940 A | 8/1995 | Hilston et al. | 429/103 |
| 5,536,600 A | 7/1996 | Kaun | 429/223 |
| 5,618,640 A | 4/1997 | Idota et al. | 429/194 |
| 5,656,394 A | 8/1997 | Koksbang et al. | 429/218 |
| 5,770,333 A * | 6/1998 | Saito et al. | 429/194 |
| 5,888,430 A * | 3/1999 | Wakayama et al. | |
| 6,051,340 A | 4/2000 | Kawakami et al. | 429/231.95 |

OTHER PUBLICATIONS

Anani et al., "Investigation of a Ternary Lithium Alloy Mixed–Conducting Matrix Electrode at Ambient Temperature", *J. Electrochem. Soc.: Solid–State Science and Technology*, pp. 2103–2105 (Aug. 1988).

Besenhard et al., "Binary and Ternary Li–Alloys as Anode Materials In Rechargeable Organic Electrolyte Li–Batteries", *Solid State Ionics*, vols. 18 & 19, pp. 823–827 (1986). (No month).

Besenhard et al., "Will advanced lithium–alloy anodes have a chance in lithium–ion batteries?", *J. of Power Sources*, 68:87–90 (1997). (No month).

Basenhard et al., "Dimensionally Stable Li–Alloy Electrodes For Secondary Batteries", *Solid State Ionics*, 40/41:525–529 (1990). (No month).

Besenhard et al., "Will Advanced Li–Alloy Anodes Have A Chance In Lithium–Ion Batteries?", Paper Presented @ the 8th International Meeting on Lithium Batteries, Nagoya Japan, 6/96, Extended Abstracts p. 69.

Dahn et al., "Mechanisms for Lithium Insertion in Carbonaceous Materials", *Science*, 270:590–593 (Oct. 27, 1995).

Yang et al., "Small particle size multiphase Li–alloy anodes for lithium–ion–batteries", *Solid State Ionics*, 90:281–287 (1996). (No month).

Courtney et al., "Key Factors Controlling the Reversibility of the Reaction of Lithium with $SnO_2$ and $SN_2BPO_6$ Glass", *J. Electrochem. Soc.*, 144(9):2943–2948 (Sep. 1997).

Wang, et al., "Behavior of Some Binary Lithium Alloys as Negative Electrodes in Organic Solvent–Based Electrolytes", *J. Electrochem. Soc.*, 133(3):457–460 (Mar. 1986).

Richard et al., "A Cell for In Situ X–Ray Dittraction Based on Coin Cell Hardware and Bellcore Plastic Electrode Technology", *J. Electrochem. Soc.*, 144(2):554–557 (Feb. 1997).

Idota et al., "Tin–Based Amorphous Oxide: A High–Capacity Lithium–Ion–Storage Material", *Science*, 276:1395–1397 (May 1997).

Fauteux et al., "Rechargeable lithium battery anodes: alternatives to metallic lithium", *J. Applied Electrochemistry*, 23:1–10 (1993). (No month).

Dey, "Electrochemical Alloying of Lithium in Organic Electrolytes", *J. Electrochem. Soc.*, 118(10):1547–1549 (1971). (No month).

Boukamp et al., "All–Solid Lithium Electrodes with Mixed–Conductor Matrix", *J. Electrochem. Soc.*, 128(4):725–728 (1981). (No month).

Copy of International Search Report for PCT/US98/15295 dated Nov. 20, 1998.

* cited by examiner

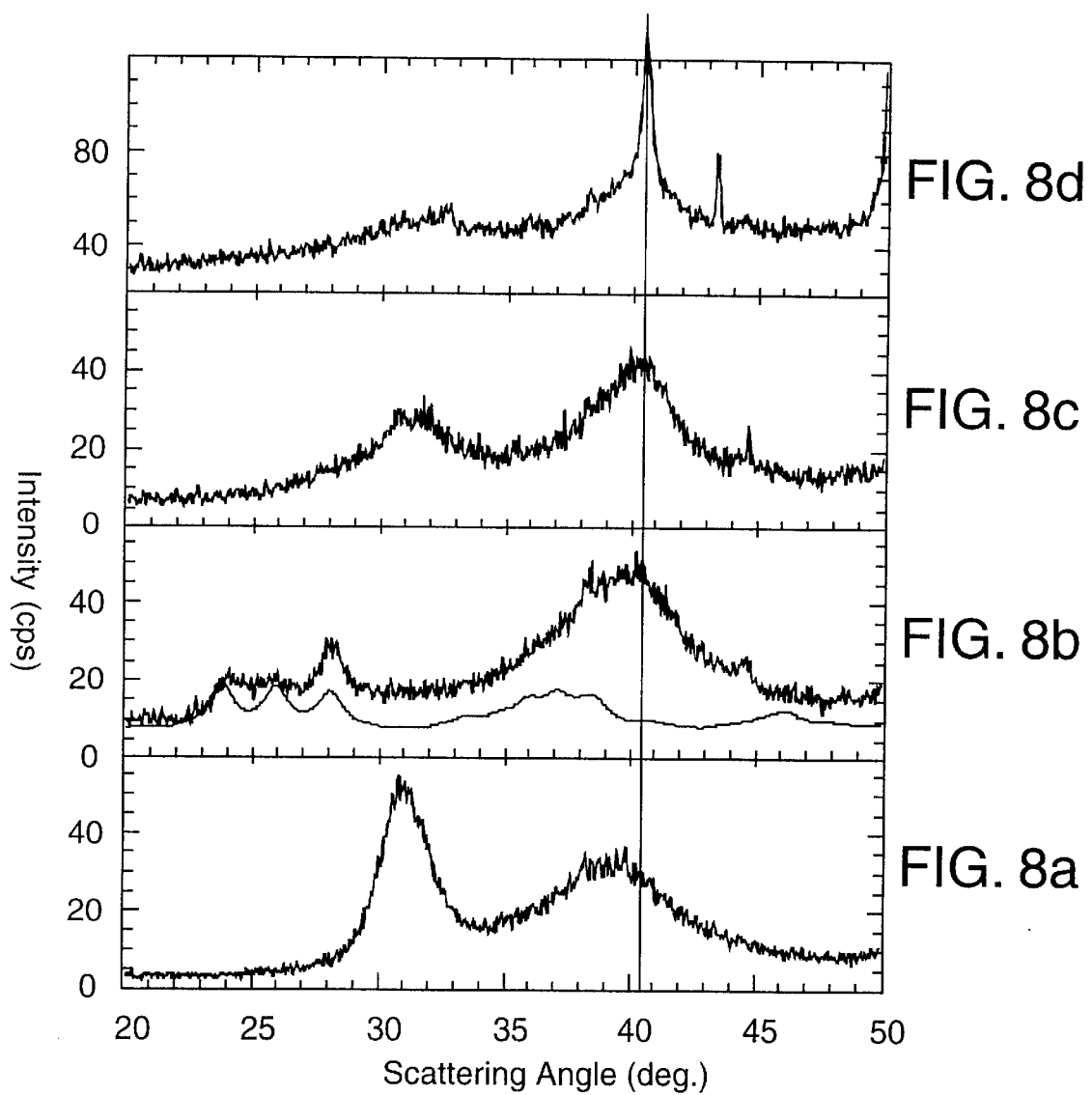

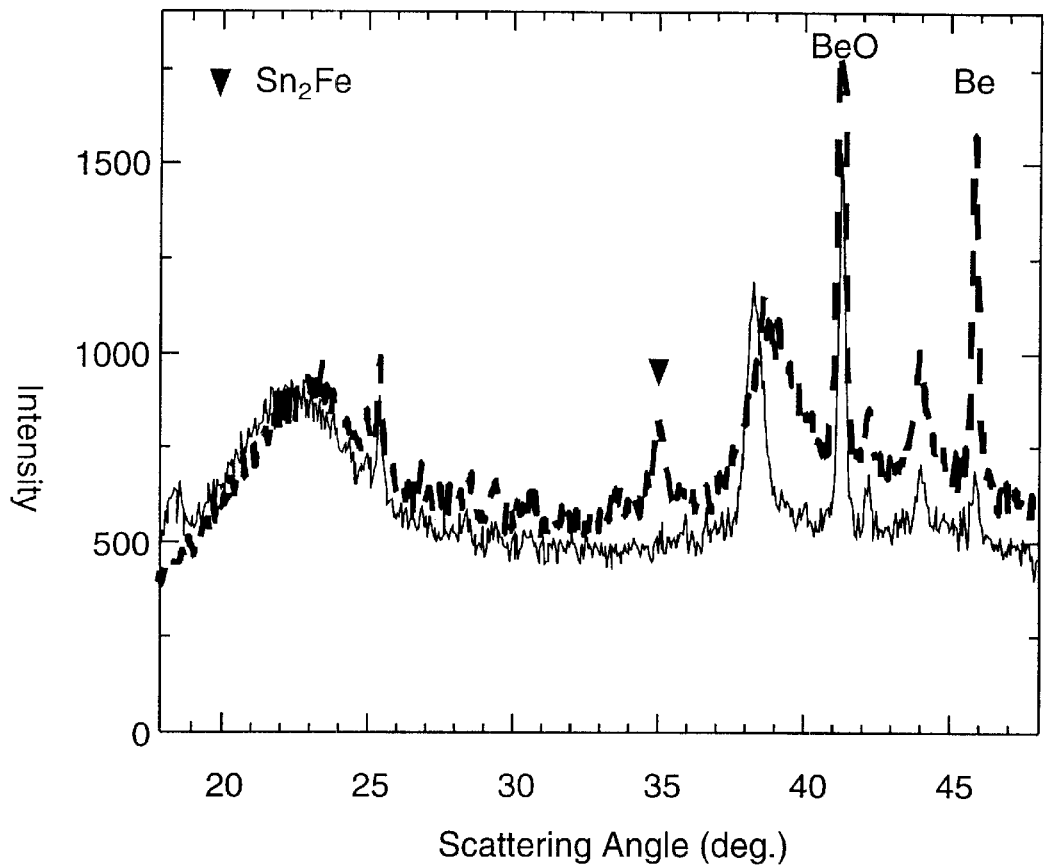
FIG. 9  Dash - Sn$_2$Fe at bottom of discharge
Solid - Sn at bottom of discharge

ELECTRODE COMPOSITIONS WITH HIGH COULOMBIC EFFICIENCIES

This is a divisional of Application Ser. No. 09/048,407 filed Mar. 26, 1998, now U.S. Pat. No. 6,203,944.

BACKGROUND OF THE INVENTION

This invention relates to electrode compositions useful in secondary lithium batteries.

Two classes of materials have been proposed as anodes for secondary lithium batteries. One class includes materials such as graphite and carbon which are capable of intercalating lithium. While the intercalation anodes generally exhibit good cycle life and coulombic efficiency, their capacity is relatively low. A second class includes metals that alloy with lithium metal. Although these alloy-type anodes generally exhibit higher capacities relative to intercalation-type anodes, they suffer from relatively poor cycle life and coulombic efficiency.

SUMMARY OF THE INVENTION

The invention provides electrode compositions suitable for use in secondary lithium batteries in which the electrode compositions have high initial capacities that are retained even after repeated cycling. The electrode compositions also exhibit high coulombic efficiencies. The electrode compositions, and batteries incorporating these compositions, are also readily manufactured.

To achieve these objectives, the invention features, in a first aspect, an electrode composition that includes (a) an electrochemically active metal element and (b) a non-electrochemically active metal element. When incorporated in a lithium battery and cycled through one full charge-discharge cycle, the composition includes crystalline regions having at least one dimension that is no greater than about 500 angstroms (preferably no greater than about 100 angstroms, more preferably no greater than about 50 angstroms) and that does not substantially increase after a total of at least 10 cycles (preferably at least 100 cycles, more preferably at least 1000 cycles).

The crystalline regions may be present prior to cycling or may appear only after one full charge-discharge cycle. In the former case, the regions persist after one full charge-discharge cycle.

An "electrochemically active metal element" is an element that reacts with lithium under conditions typically encountered during charging and discharging in a lithium battery. A "non-electrochemically active metal element" is an element that does not react with lithium under those conditions. In both cases, the metal element may be found in the electrode composition in the form of a metal containing only the element itself (i.e., an elemental metal) or a compound containing the element in combination with one or more elements which may or may not be metal elements. An example of the latter is an intermetallic compound containing the metal element in combination with one or more metal elements. Prior to cycling, however, the electrochemically active metal element is in the form of an intermetallic compound or an elemental metal.

Where the electrochemically active metal element is part of a compound, the compound itself need not be electrochemically active, although it may be. Similarly, where the non-electrochemically active metal element is part of a compound, the compound itself need not be non-electrochemically active, although it may be.

An example of a preferred electrochemically active metal element is tin. Examples of preferred non-electrochemically active metal elements include molybdenum, niobium, tungsten, tantalum, iron, copper, and combinations thereof. Particularly preferred electrode compositions are those in which (a) the electrochemically active metal element is tin and the non-electrochemically active metal element is molybdenum; (b) the electrochemically active metal element is tin and the non-electrochemically active metal element is iron; (c) the electrochemically active metal element is tin and the non-electrochemically active metal element is niobium; (d) the electrochemically active metal element is tin and the non-electrochemically active metal element is tungsten; and (e) the electrochemically active metal element is tin and the non-electrochemically active metal element is tantalum.

The crystalline regions are characterized by a discernible x-ray diffraction pattern characteristic of a crystalline material. In terms of chemical composition, at least one of the crystalline regions preferably includes the electrochemically active metal element and at least another of the crystalline regions includes the non-electrochemically active metal element.

The crystalline regions are preferably separated by regions comprising the electrochemically active metal element and the non-electrochemically active metal element in which the relative proportions of the these elements vary throughout the thickness direction of the composition. For cases in which the electrode composition is in the form of a thin film, the "thickness direction of the composition" refers to the direction perpendicular to the substrate on which the film is deposited. Where the electrode composition is in the form of a powder representing a collection of individual particles, the "thickness direction of the composition" refers to the thickness direction of an individual particle.

The regions separating the crystalline regions do not exhibit an electron diffraction pattern characteristic of a crystalline material. They may be present prior to cycling, after cycling, or both before and after cycling.

When the electrode composition is incorporated in a lithium battery and cycled to realize about 100 mAh/g of electrode composition, the electrode composition preferably exhibits a coulombic efficiency of at least about 99.0% (more preferably at least about 99.8%, even more preferably about 99.9%) after 100 full discharge cycles. The electrode composition may be provided in the form of a thin film or a powder.

In a second aspect, the invention features an electrode composition that includes (a) an electrochemically active metal element and (b) a non-electrochemically active metal element. When incorporated in a lithium battery and cycled through one full charge-discharge cycle, the composition includes crystalline regions. In addition, when incorporated in a lithium battery and cycled to realize about 100 mAh/g of electrode composition, the electrode composition exhibits a coulombic efficiency of at least about 99.0% (preferably at least about 99.8%, more preferably at least about 99.9%) after 100 full discharge cycles.

The crystalline regions may be present prior to cycling or may appear only after one full charge-discharge cycle. In the former case, the regions persist after one full charge-discharge cycle.

The electrochemically active metal element and non-electrochemically metal element have the definitions described above. In both cases, the metal element may be found in the electrode composition in the form of a metal containing only the element itself (i.e., an elemental metal) or a compound containing the element in combination with one or more elements which may or may not be metal elements. An example of the latter is an intermetallic compound containing the metal element in combination with one or more metal elements. Prior to cycling, however, the electrochemically active metal element is in the form of an intermetallic compound or an elemental metal.

The electrode composition may be provided in the form of a thin film or a powder. An example of a preferred electrochemically active metal element is tin. Examples of preferred non-electrochemically active metal elements include molybdenum, niobium, tungsten, tantalum, iron, copper, and combinations thereof. Particularly preferred electrode compositions are those in which (a) the electrochemically active metal element is tin and the non-electrochemically active metal element is molybdenum; (b) the electrochemically active metal element is tin and the non-electrochemically active metal element is iron; (c) the electrochemically active metal element is tin and the non-electrochemically active metal element is niobium; (d) the electrochemically active metal element is tin and the non-electrochemically active metal element is tungsten; and (e) the electrochemically active metal element is tin and the non-electrochemically active metal element is tantalum.

The crystalline regions are characterized by a discernible x-ray diffraction pattern. In terms of chemical composition, at least one of the crystalline regions preferably includes the electrochemically active metal element and at least another of the crystalline regions includes the non-electrochemically active metal element.

The crystalline regions are preferably separated by regions comprising the electrochemically active metal element and the non-electrochemically active metal element in which the relative proportions of the these elements vary throughout the thickness direction of the composition (as defined, above). These regions separating the crystalline regions exhibit no discernible electron diffraction pattern characteristic of a crystalline material. They may be present prior to cycling, after cycling, or both before and after cycling.

In a third aspect, the invention features a method of preparing an electrode composition that includes combining (a) a source comprising an electrochemically active metal element and (b) a source comprising a non-electrochemically active metal element to form an electrode composition characterized in that: (i) when incorporated in a lithium battery and cycled through one full charge-discharge cycle, the electrode composition includes crystalline regions and (ii) when incorporated in a lithium battery and cycled to realize about 100 mAh/g of the composition, the electrode composition exhibits a coulombic efficiency of at least about 99.0% after 100 full discharge cycles.

In one preferred embodiment, the source of the electrochemically active metal element and the source of the non-electrochemically active element are sequentially sputter-deposited onto a substrate. In another preferred embodiment, the two sources are combined by ball milling.

The above-described electrode compositions may be combined with a counterelectrode and an electrolyte separating the electrode and counterelectrode to form a lithium battery.

Other features and advantages of the invention will be apparent from the following description of the preferred embodiments thereof, and from the claims.

BRIEF DESCRIPTION OF THE DRAWINGS

FIG. 8 is a series of x-ray diffraction profiles for a tin-molybdenum film having 54 wt. % tin and 46 wt. % molybdenum obtained after 0, 1, 4, and 10 cycles.

FIG. 9 reports the results of an in-situ x-ray diffraction experiment involving a tin metal electrode and an $Sn_2Fe$ electrode.

DETAILED DESCRIPTION

Figure 1A:
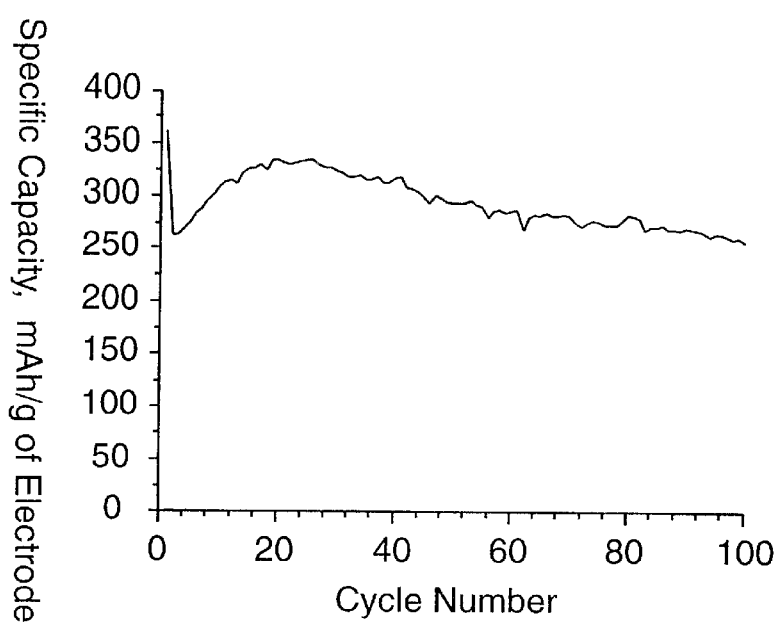
FIG. 1 illustrates the cycling performance, in terms of reversible specific capacity (top graph) and coulombic efficiency (bottom graph), of a sputter-deposited tin-molybdenum electrode having 54 wt. % tin and 46 wt. % molybdenum.

The invention features electrode compositions that are particularly useful as anodes for secondary lithium batteries. The electrode compositions feature an electrochemically active metal element and a non-electrochemically active metal element combined in a microstructure which, the inventors have discovered, results in an electrode composition that exhibits a high initial capacity that is substantially retained after repeated cycling.

An example of a suitable electrochemically active metal element is tin. Examples of suitable non-electrochemically active metal elements are molybdenum, niobium, tungsten, tantalum, iron, copper, and combinations thereof, with molybdenum being particularly preferred. These elements may be present in the form of single element metals, intermetallic compounds, or compounds featuring the metal element combined with one or more non-metallic elements. In addition, the particular form in which the element is present may change over the course of repeated cycling. For example, alloys may form with other material present in the electrode composition. For optimum performance, however, the electrochemically active metal element is present in the form of an elemental metal (e.g., tin metal) or as an intermetallic compound prior to cycling.

The microstructure of the electrode composition is characterized by the presence of small crystalline regions. These regions give rise to x-ray and electron diffraction patterns characteristic of crystalline material. In some embodiments, e.g., in the case of some compositions prepared by sputtering, these regions are present prior to cycling and remain after at least one full charge-discharge cycle. In other embodiments, e.g., in the case of some compositions prepared by ball milling, these regions form only after the composition has been through one full charge-discharge cycle.

The crystalline regions are very small, three-dimensional structures characterized by x-, y-, and z-dimensions. At least one of these dimensions is no greater than about 500 angstroms (preferably no greater than about 100 angstroms, more preferably no greater than about 50 angstroms), determined from examination of transmission electron micrographs of the material. Upon cycling, this dimension does not substantially increase after a total of at least 10 cycles (preferably at least 100 cycles, more preferably at least 1000 cycles). The crystalline regions, therefore, remain very small even after repeated cycling. It is believed that this property contributes to the ability of the electrode composition to substantially retain its initial capacity after repeated cycling.

Within a given electrode composition, there are preferably crystalline regions that contain the electrochemically active metal element and separate crystalline regions that contain the non-electrochemically active metal element. For example, in the case of a sputter-deposited tin-molybdenum electrode composition, prior to cycling there may be crystalline regions containing tin metal and crystalline regions containing molybdenum metal.

The crystalline regions are preferably separated by regions that, when examined by transmission electron microscopy, do not give rise to an electron diffraction pattern characteristic of a crystalline material. Specifically, these regions do not exhibit the relatively sharp rings or spots characteristic of a crystalline material. In addition, high resolution electron microscopy, which can provide structural information on an atomic (2 angstrom) scale, likewise failed to detect the presence of crystalline material. Based upon electron microscopy data, these regions can be described as containing material of a highly disordered atomic arrangement on a length scale no greater than about 20 angstroms, preferably no greater than about 10 angstroms.

Compositional analysis using x-ray microanalysis (also referred to as x-ray energy dispersive spectroscopy) of these regions reveals that they contain both the electrochemically active metal element and the non-electrochemically active metal element, and that the relative proportions of these two elements vary throughout the thickness direction of the sample. We refer to this feature as "composition modulation." The composition preferably varies on a scale no greater than about 50 angstroms, preferably no greater than about 20 angstroms.

Composition modulation may be present before and/or after cycling, as long as crystalline regions are also present. It is believed that the presence of these composition modulated areas contributes to the ability of the electrode to retain its capacity after cycling because these areas are more flexible than the crystalline areas, enabling the composition as a whole to dissipate cycling-induced stresses that would otherwise cause the electrode to crack and fail.

The electrode compositions may be prepared in the form of thin films or powders according to a variety of methods. Examples include sputtering, chemical vapor deposition, vacuum evaporation, melt spinning, splat cooling, spray atomization, and ball milling. The choice of technique determines whether the electrode composition is prepared in the form of a thin film or a powder. Sputtering, for example, produces the electrode composition in the form of a thin film, whereas ball milling produces the electrode composition in the form of a free flowing powder which can then be combined with, e.g., a polymeric binder to form an electrode suitable for incorporation in a battery.

The preferred process for preparing the electrode composition is sputtering in which the electrochemically active metal element and the non-electrochemically active metal element are sequentially sputter-coated onto a substrate (e.g., a copper substrate). Preferably, the electrode includes a sputter-deposited prelayer of one of the elements and a sputter-deposited overlayer of one of the elements. In general, the substrates are placed near the edge of a nominally 25 inch diameter turntable which rotates continuously below two 6 inch diameter magnetron sputtering sources operated continuously. A layer of one material is deposited as the substrate passes under the first source, and a layer of the second material is deposited as the substrate passes under the second source. By knowing the rotation speed of the turntable and the sputtering rates of the two sources, the nominal thickness of each layer can be predicted and controlled. By calculating the total deposition time, the thickness of the entire sample, and the number of individual layers, can be determined.

In the case of samples having very thin individual layers, the final structure may not contain evidence of a layered structure. On the other hand, evidence of a layered structure may be found in the case of thicker layers.

The electrode compositions are particularly useful as anodes for secondary lithium batteries. To prepare a battery, the electrode is combined with an electrolyte and a cathode (the counterelectrode). The electrolyte may be a solid or liquid electrolyte. Examples of solid electrolytes include polymeric electrolytes such as polyethylene oxide, polytetrafluoroethylene, fluorine-containing copolymers, and combinations thereof. Examples of liquid electrolytes include ethylene carbonate, diethylene carbonate, propylene carbonate, and combinations thereof. The electrolyte is provided with a lithium electrolyte salt. Examples of suitable salts include $LiPF_6$, $LiBF_4$, and $LiClO_4$.

Examples of suitable cathode compositions for liquid electrolyte-containing batteries include $LiCoO_2$, $LiCo_{0.2}Ni_{0.8}O_2$, and $Li_{1.07}Mn_{1.93}O_4$. Examples of suitable cathode compositions for solid electrolyte-containing batteries include $LiV_3O_8$ and $LiV_2O_5$.

The invention will now be described further by way of the following examples.

EXAMPLES

A. Electrode Compositions Prepared By Sputtering

A series of electrodes films was prepared by sputtering and, in some instances, characterized according to the following general procedures.

Sputtering Procedure

Electrode compositions in the form of thin films were prepared by sequential sputtering using a modified Perkin-Elmer Randex Model 2400-8SA Sputtering System. The original 8 inch diameter rf sputter sources were replaced with 6 inch diameter dc magnetron sputtering sources commercially available from Materials Science of San Diego, Calif. The sputtering sources were powered using Advanced Energy Model MDX-10 dc sputtering power supplies operating in constant current mode. The turntable drive unit of the Randex System was replaced with a stepper motor to improve rotation speed range and control. The System was pumped with an untrapped oil diffusion pump backed by a conventional rotary vane pump.

Sputtering was performed at argon pressures in the range of 3–30 mTorr. The pressure was maintained by controlling the argon flow in combination with a venetian blind-style conductance limiter placed over the diffusion pump.

A copper foil (thickness=0.001 inch) was bonded to the water-cooled substrate turntable of the Randex System using double sided adhesive tape (3M Brand Y9415, commercially available from 3M Company of St. Paul, Minn.). The system was closed and pumped down, typically to base pressures below $1\times10^{-5}$ Torr (the base pressure prior to deposition is not critical). In some cases, the samples were etched prior to deposition using the "Sputter Etch" mode of the Randex System with 13.56 MHz power applied to the substrate turntable and an argon pressure of 8 mTorr in the sputtering chamber. This procedure caused the copper foil surface to be bombarded with moderate energy argon ions (100–150 eV) to further clean the copper and insure good adhesion of the sputtered film to the copper surface. A typical cleaning cycle was 150 W for 30 minutes, with the substrate table rotating during the cycle.

Following etching, the sputtering sources were started up using a mechanical shutter between the sources and the copper substrate. This removed contaminants from the source surface without depositing them on the substrate surface. Next, a "pre-layer" made of a single material of known identity was deposited onto the substrate. The purpose of the pre-layer was to insure good adhesion between the substrate and the sputter deposited film. Next, both sources were started up at predetermined current levels and deposition initiated. After a suitable deposition time, one or both sources were turned off. A "post-layer" of a single material of known identity was then deposited, after which the system was vented and the sample removed.

Seven films (corresponding to Examples 1–7) were prepared following the above-described procedure. Sputtering conditions are summarized in Table I, below. In Table I, "current" refers to the current level, in amps, of the individual sputtering source. "Pressure" refers to the argon pressure, in mTorr, in the sputtering chamber. "Run time" refers to the amount of time required for deposition, exclusive of the pre- and post-layers.

Chemical Composition

The chemical composition, in wt. % and vol. %, was determined using a series of calibration experiments in which a single source was operated at a fixed current for a fixed period of time. The thickness of the resulting sample was then determined using a profilometer. The vol. % of the sample was predicted based upon the calibration experiments assuming that the total thickness of any one material was linearly proportional to the deposition current and the deposition time. The wt. % values were calculated from the vol. % values using handbook values of material densities.

Transmission Electron Microscopy

Transmission electron microscopy ("TEM") was used to examine the microstructure of the sputtered electrode films before and after cycling. This technique produces images of the microstructure using spatial variations in transmitted intensity associated with spatial variations in the structure, chemistry, and/or thickness of the sample. Because the radiation used to form these images consists of high energy electrons of very short wavelength, it is possible to obtain information at the atomic scale under high resolution electron microscopy (HREM) imaging conditions. Moreover, the interaction of these electrons with the sample produces information about the crystal structure (electron diffraction) and local chemistry (x-ray microanalysis) that is complementary to the information contained in the image.

Prior to cycling, samples were prepared from sputtered films either by crushing to powder or by cutting the film in either the radial direction (i.e., slices were taken along the radial direction of the film) or the perpendicular direction of the film (i.e., slices were taken along the tangential direction of the film). The cut samples were then embedded in 3M Scotchcast™ Electrical Resin #5 (commercially available from 3M Company of St. Paul, Minn.) and ultramicrotomed to obtain slices thin enough for TEM examination. Slice thickness was nominally less than about 20 nm.

Two types of TEM instrumentation were used to obtain microstructural data. The first type consisted of a HITACHI H9000NAR transmission electron microscope which operates at an accelerating voltage of 300 kV. It is capable of a point-to-point resolution of 1.75 angstroms and a microprobe resolution of 16 angstroms for x-ray microanalysis.

TABLE I

| Example | Materials | Currents A | Rot. RPM | Pressure mTorr | Run Time Min | Pre Layer | Time Min | Post Layer | Time Min | Etch Time |
|---|---|---|---|---|---|---|---|---|---|---|
| 1 | Sn | 1 | 38 | 15 | 82 | | | Sn | 5 | 30 |
| | Cu | 1 | | | | Cu | 2 | | | |
| 2 | Sn | 1 | 38 | 15 | 80 | | | Sn | 5 | 30 |
| | Mo | 1.54 | | | | Mo | 2 | | | |
| 3 | Sn | 0.2 | 38 | 15 | 350 | | | Sn | 5 | 30 |
| | Mo | 0.3 | | | | Mo | 2 | | | |
| 4 | Sn | 1 | 38 | 15 | 70 | | | Sn | 5 | 30 |
| | Mo | 2.2 | | | | Mo | 2 | | | |
| 5 | Sn | 1 | 38 | 15 | 70 | | | Sn | 5 | 30 |
| | Nb | 2.2 | | | | Nb | 2 | | | |
| 6 | Sn | 1 | 38 | 15 | 60 | | | Sn | 5 | 30 |
| | W | 1.7 | | | | W | 2 | | | |
| 7 | Sn | 1.4 | 38 | 15 | 60 | | | | | 30 |
| | Mo | 1.55 | | | | Mo | 2 | | | |

The composition, microstructure, and cycling behavior of these films are described in further detail, below.

The microanalysis instrumentation consisted of a NORAN VOYAGER III. Direct-to-digital image acquisition and quantitative length measurements were performed by a GATAN slow-scan CCD (charged-couple device) camera.

The second type of TEM instrumentation consisted of a JEOL 4000 FEX which operates at an accelerating voltage of 200 kV. It is capable of a point-to-point resolution of 2 angstroms and a microprobe resolution of 20 angstroms for x-ray microanalysis.

Samples were also examined by TEM after cycling by opening up the electrochemical cell in an inert atmosphere after a specified number of cycles and removing the sputtered film from the copper substrate by repeated scoring of the electrode surface with a razor blade. The resulting material, in the form of a powder, was then collected onto a carbon mesh supported by a copper grid and inserted into the microscope for structural analysis.

Cycling Behavior

Electrodes were cut from the sputtered films with a die measuring either 7.1 or 7.5 mm in diameter. Two types of cells for testing were then prepared. In the first type, the sputtered film formed the cathode and a lithium foil (about 300 micrometers thick, available from Aldrich Chemical Co. of Milwaukee, Wis.) formed both the anode and the reference electrode of a 1225 coin cell. In the second type (a full cell), the sputtered film formed the anode and a $LiCoO_2$-containing composition formed the cathode. The $LiCoO_2$-containing composition was made by combining 83% wt. % $LiCoO_2$ (available from Nippon Chemical Cellseed under the designation "C-10"), 7 wt. % fluoropolymer binder (available from Elf Atochem under the designation "Kynar 461"), 7.5 wt. % KS-6 carbon (available from Timcal), and 2.5% Super P Carbon (available from MMM Carbon).

Both types of cells were made with a 50 micrometer thick polyethylene separator. The electrolyte in all cells was 1 molal $LiPF_6$ in a 1:1 v/v mixture of ethylene carbonate and diethyl carbonate. Spacers were used as current collectors and to fill void areas in the cells. Copper or stainless steel spacers were used in all cases except when the cell included $LiCoO_2$, in which case aluminum was used as the spacer.

The electrochemical performance of the cells was measured using a MACCOR cycler. The cycling conditions were typically set for constant current charge and discharge at approximately a C/3 rate (0.5 $mA/cm^2$) with typical cutoff voltages of 5 mV and 1.4 V. Where the anode was a lithium foil, the coulombic efficiency was determined as the charge recovery or capacity of delithiation divided by the capacity of lithiation. Where the anode was the sputtered film, the coulombic efficiency was determined as the ratio of the discharge capacity to the charge capacity.

In many of the sputtered films, the resistance is higher at the beginning of the cycle life and drops after 10–20 cycles. This resistive effect causes the capacity of the cell to drop initially and then stabilize after 10–20 cycles. The resistive effect also causes the measured coulombic efficiency to be higher than 100% in the first few cycles because the capacity for delithiation is increasing with cycle number out to 10–20 cycles.

X-Ray Diffraction

X-ray studies of cycled material were performed as follows. After the cell had been charged or discharged to the desired voltage and equilibrated, it was placed in an argon-filled glove box and carefully opened to ensure that short circuiting did not occur. The electrode was recovered and mounted in an air-tight sample holder equipped with Kapton x-ray windows. The sample was then removed from the glove box and placed in the diffractometer. Powder x-ray diffraction patterns were collected using a Siemens D5000 diffractometer equipped with a copper target x-ray tube and a diffracted beam monochromator. Data was collected between scattering angles of 10 degrees and 80 degrees.

We now describe the preparation and characterization of specific sputtered electrode films.

Example 1

A film containing 55.2 wt. % tin and 44.8 wt. % copper was prepared by sputter deposition under the conditions shown in Table I. The tin was sputter deposited at a rate of 555 angstroms/minute, while the copper was sputter deposited at a rate of 367 angstroms/minute. The film contained 60 vol. % tin and 40 vol. % copper, calculated based upon these sputter rates. The film thickness was 7.1 micrometers and the film density was approximately 7.8 $g/cm^3$. The film had a pre-layer of pure copper measuring approximately 600 angstroms thick and a post-layer of pure tin measuring approximately 2500 angstroms thick.

Figure 5A:
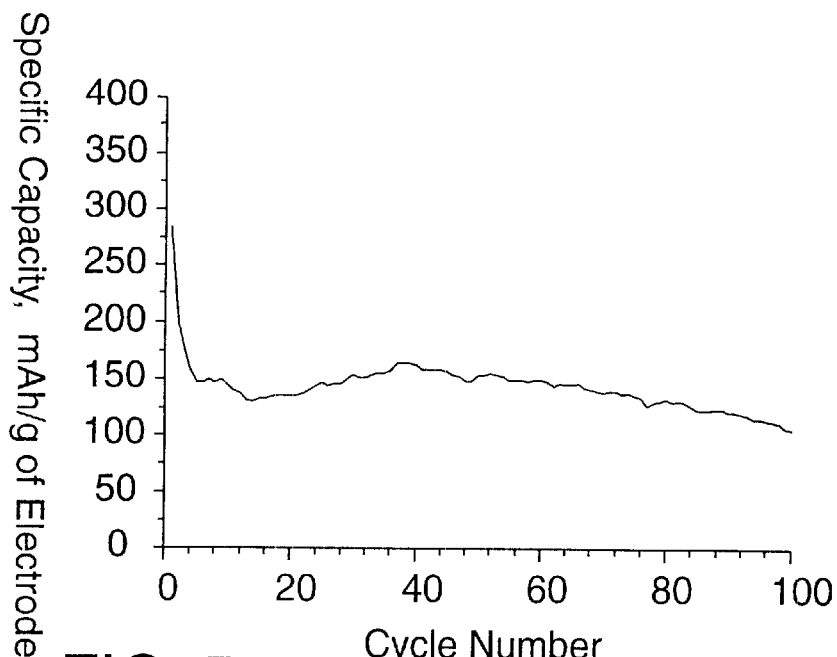
FIG. 5 illustrates the cycling performance, in terms of reversible specific capacity (top graph) and coulombic efficiency (bottom graph), of a sputter-deposited tin-copper electrode having 55.2 wt. % tin and 44.8 wt. % copper.
Figure 5B:
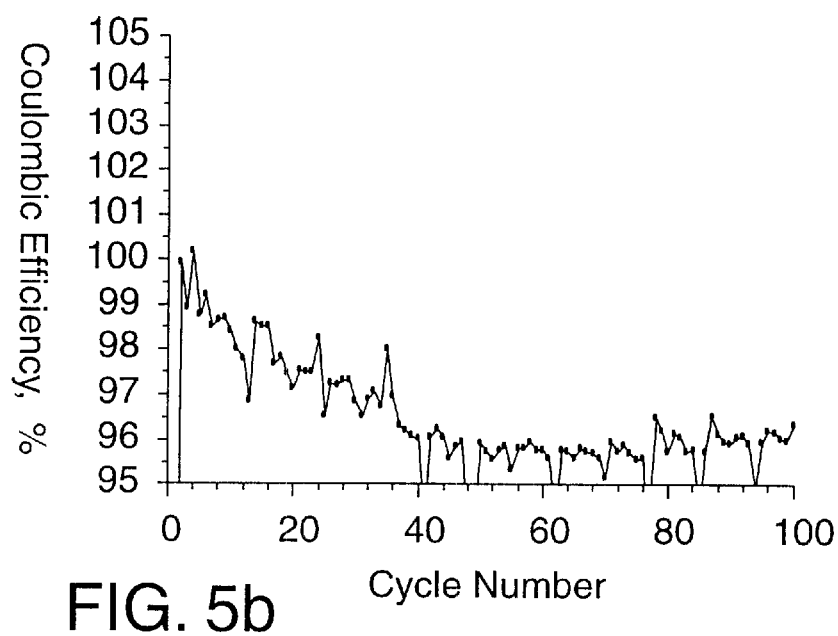

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.5 $mA/cm^2$ and cutoff voltages of 5 mV and 1.4 V. The specific capacity and coulombic efficiency of the cell in shown in FIG. 5. The results demonstrate that an electrode composition using tin as the electrochemically active metal element and copper as the non-electrochemically active metal element yields stable reversible capacities of 125 mAh/g for at least 100 cycles, which is a longer cycle life than pure tin, although the coulombic efficiency was less than 99.0% after a few cycles.

Example 2

A film containing 54 wt. % tin and 46 wt. % molybdenum was prepared by sputter deposition under the conditions shown in Table I. The tin was sputter deposited at a rate of 550 angstroms/minute, while the molybdenum was sputter deposited at a rate of 340 angstroms/minute. The film contained 62 vol. % tin and 38 vol. % molybdenum, calculated based upon these sputter rates. The film thickness was 5.3 micrometers and the film density was approximately 7.3 $g/cm^3$. The film had a pre-layer of pure molybdenum measuring approximately 700 angstroms thick and a post-layer of pure tin measuring approximately 2500 angstroms thick.

Figure 10:
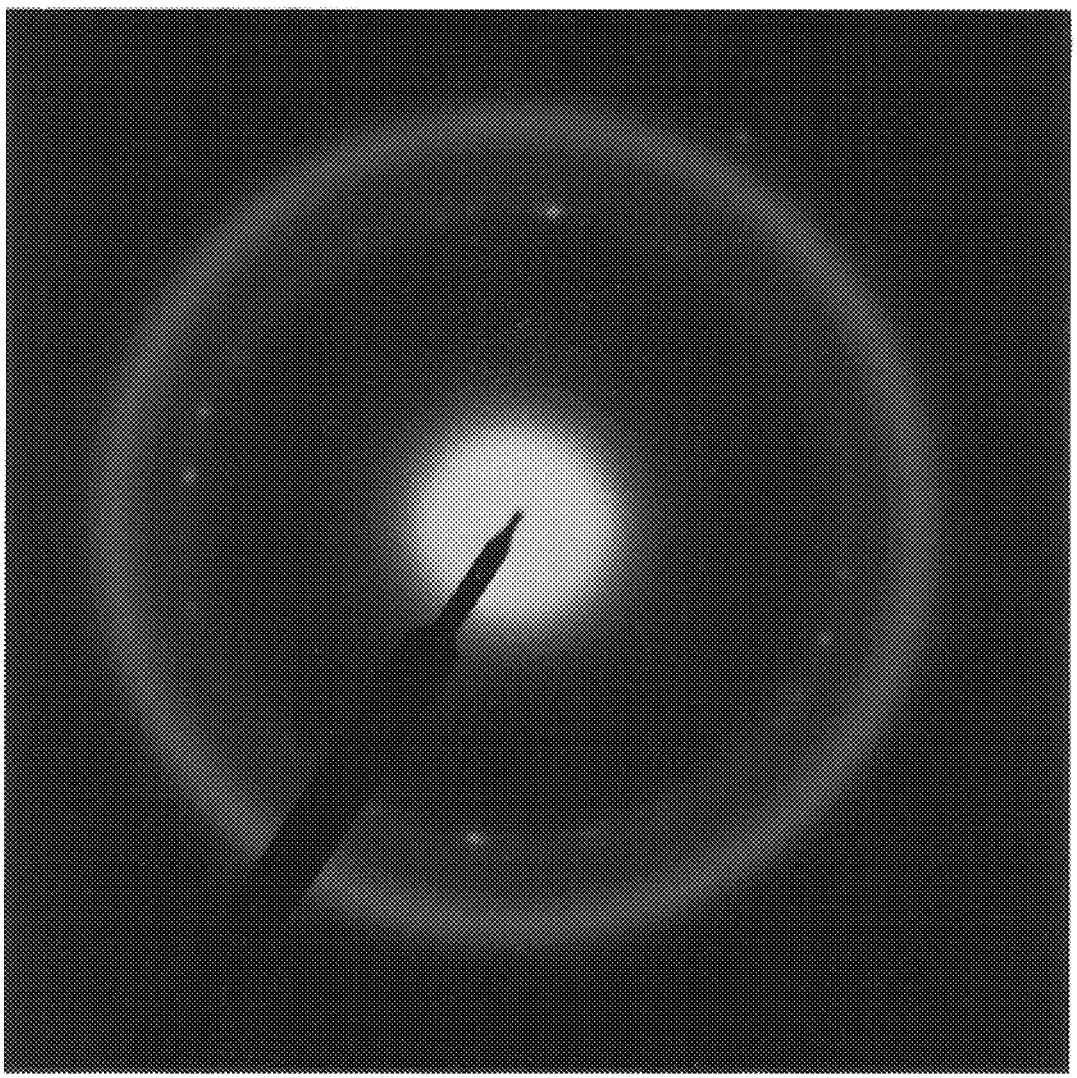
FIG. 10 is an electron diffraction pattern of the tin-molybdenum film that is the subject of FIG. 1.

TEM analysis of the film prior to cycling revealed that the microstructure of the film included crystalline tin particles in a compositionally modulated matrix phase. Electron diffraction patterns (FIG. 10) indicated the presence of a two phase microstructure: crystalline tin (as evidenced by sharp spots in a ring pattern which indexes to tetragonal tin) and a matrix phase characterized by a broad diffuse ring pattern, suggesting the absence of ordered crystalline material. High resolution electron microscopy verified that the matrix phase was disordered on a 10 angstrom scale.

TEM analysis of the radially cut samples showed that the measured average tin particle size was 5±1.3 nm by 19±5.9 nm. The measured range of particle sizes was from 3×17 nm (smallest) to 7×31 nm (largest). The tin particles had aspect ratios ranging from approximately 2:1 to 6:1, with the long dimension parallel to the plane of the film.

TEM analysis of the perpendicularly cut samples showed that the measured average tin particle size was 7±2.0 nm by 33±12.7 nm. The measured range of particle sizes was from 4×12 nm (smallest) to 8×67 nm (largest). The tin particles had aspect ratios ranging from approximately 1.2:1 to 7:1, with the long dimension parallel to the plane of the film.

TEM analysis of the matrix phase revealed this phase to be compositionally modulated perpendicular to the plane of the film, as evidenced by wandering "stripes" in the TEM images. By underfocusing the image, the contrast differences between tin-rich and molybdenum-rich regions (relative to the bulk composition) could be enhanced.

X-ray microanalysis of the matrix phase confirmed the presence of a compositionally modulated structure. The x-ray data was obtained using a TEM probe size of 16 angstroms moved along steps adjacent to a tin particle in a direction normal to the plane of the film. Two sets of data were collected. The first set centered around a relatively small tin particle located near the top edge of the film using a long scan. The second set centered around a relatively large tin particle located in the middle of the film using a short scan. The compositional results were determined using a standardless quantitative analysis routine, and are shown in Tables II (small tin particle) and III (large tin particle). As shown in Tables II and III, both the matrix surrounding the large particle and the small particle showed compositional modulation. For comparison, the average bulk composition, determined using a 100 nm probe, was 45.6 wt. % tin and 54.4 wt. % molybdenum.

TABLE II

| Sample | Wt. % Mo | Wt. % Sn |
|---|---|---|
| Sn particle | 42.3 | 57.7 |
| adj. x1 | 53.6 | 46.4 |
| adj. x2 | 57.1 | 42.9 |
| adj. x3 | 46.5 | 53.5 |

TABLE III

| Sample | Wt. % Mo | Wt. % Sn |
|---|---|---|
| Sn particle | 33.1 | 66.9 |
| adj. x1 | 42.7 | 57.3 |
| adj. x2 | 52.8 | 47.2 |
| adj. x3 | 41.3 | 58.7 |

Figure 1B:
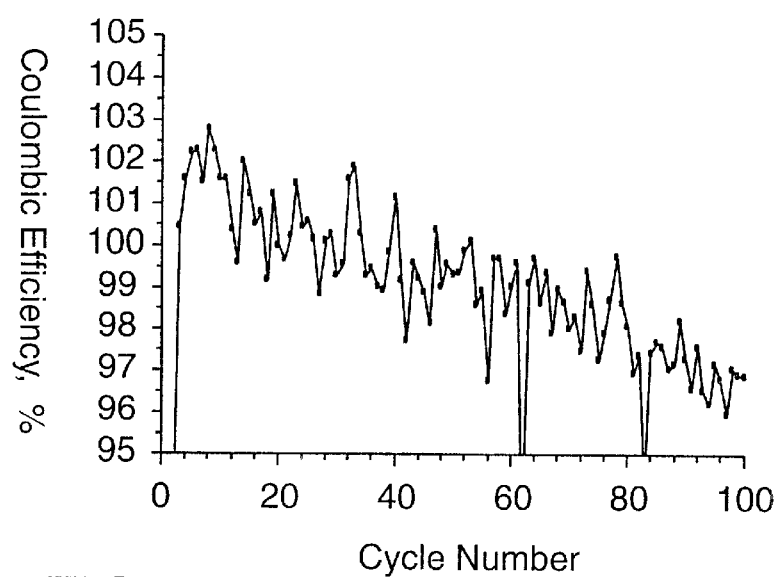

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.5 mA/cm$^2$ and cutoff voltages of 5 mV and 1.4 V. The specific capacity and coulombic efficiency of the cell in shown in FIG. 1. The results demonstrate that the sputtered tin-molybdenum film exhibited a reversible capacity of approximately 300 mAh/g for at least 50 cycles before the coulombic efficiency dropped below 99.0%.

A second sample of the film was cycled under the conditions described above for 1, 2, 10, and 30 cycles. After each cycling period, a sample of the electrode film was removed as described above and subjected to TEM analysis. The TEM results demonstrated that individual crystalline regions could be resolved in the material after 2, 10, and 30 cycles using the dark field technique. These samples had crystallite sizes less than 150 angstroms in diameter, with the majority of the crystallites having a diameter under 100 angstroms. In addition, material cycled 1, 2, and 10 cycles exhibited a high frequency spatial variation in transmitted intensity along a single specific direction with a characteristic wavelength of 20 angstroms. This suggests a high frequency spatial modulation in chemical composition, with the structure being characterized by a single wave vector perpendicular to the copper substrate. This is consistent with a macro-structure built up by alternating layers of molybdenum-rich and tin-rich slabs with a periodicity of about 20 angstroms.

The post-cycling TEM results also demonstrated that the crystal growth process was inhibited at least up to the 30th cycle. In addition, images consistent with the spatially modulated chemical composition in the original molybdenum/tin structure were observed up to the 10th cycle.

Full cells were constructed as described above using the sputtered film as an anode and a LiCoO$_2$-containing composition as the cathode. The mass balance, calculated based upon the weight of LiCoO$_2$ portion of the cathode and the weight of the entire tin-molybdenum anode, was 3.3:1. The cell were then cycled at a constant charge and discharge current of 0.5 mA/cm from 2.2 to 4.2 V. The discharge current was allowed to drop to 50 microamps/cm$^2$ before onset of the charge current.

Figure 7A:
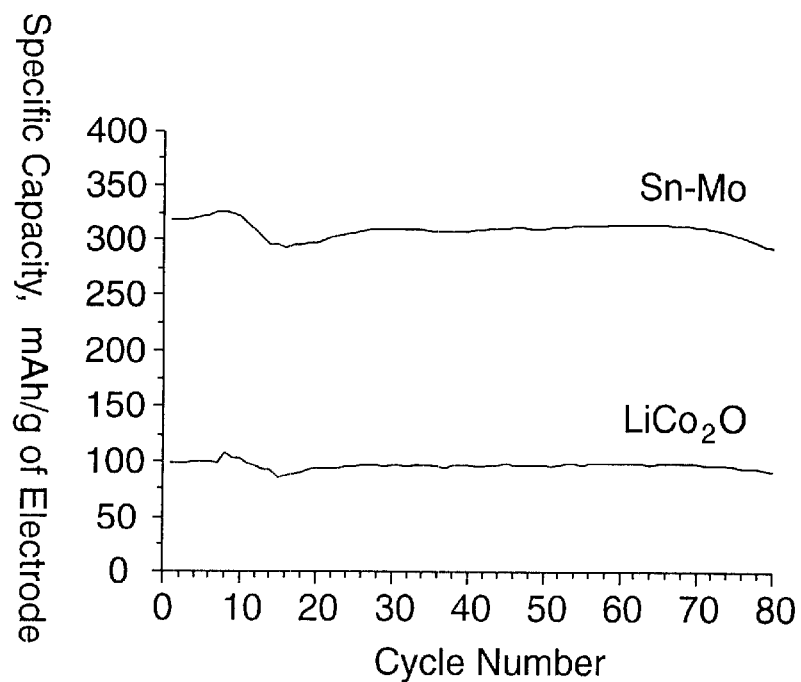
FIG. 7 illustrates the cycling performance, in terms of reversible specific capacity (top graph) and coulombic efficiency (bottom graph), of a full cell featuring a sputter-deposited tin-molybdenum anode having 54 wt. % tin and 46 wt. % molybdenum and a $LiCoO_2$-containing cathode.
Figure 7B:
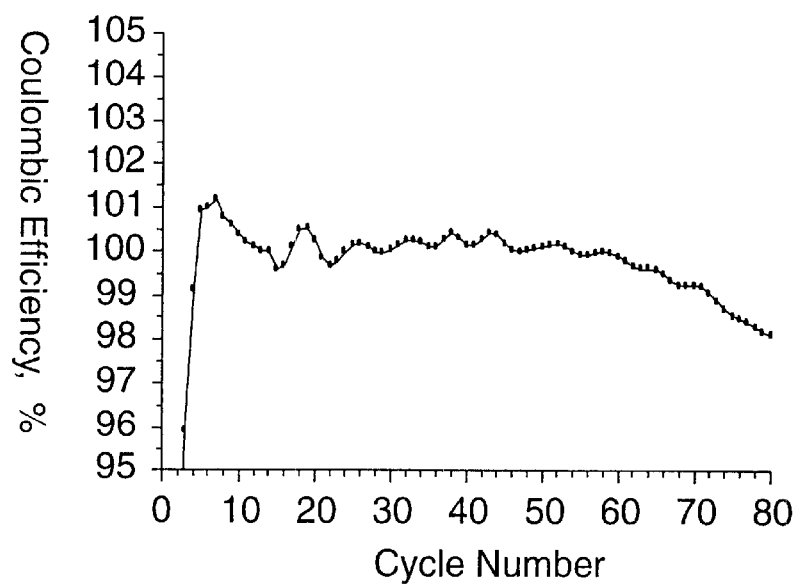

The specific capacity and coulombic efficiency of the cell in shown in FIG. 7. The dip in the plots around cycle 15 represents a change in the current from 0.25 mA/cm$^2$ to 0.50 mA/cm$^2$. The first charge capacity was 145 mAh/g for LiCoO$_2$ and 450 mAh/g for the tin-molybdenum material in the anode. The irreversible capacity in the first cycle was 30%. The specific capacity of the tin-molybdenum is similar to what was obtained in the coin cells described above using lithium foil as the anode. The specific capacity of the LiCoO$_2$ was maintained at 100 mAh/g, which is a reasonable capacity for this material.

The results demonstrate that the tin-molybdenum composition can be used in an electrochemical cell as an anode in combination with a cathode material (LiCoO$_2$) typically used in lithium-ion batteries. The coulombic efficiency of the cell remains above 99.0% for at least 70 cycles.

Next, a tin-molybdenum film identical to the above-described film was prepared with the exception that it did not contain a tin post-layer. The film was then incorporated in a coin cell containing a lithium foil anode and electrochemically cycled as described above. X-ray diffraction data was gathered on the film after 0, 1, 4, and 10 full cycles. The results are shown in FIG. 8(a)–(d).

FIG. 8(a) shows the x-ray diffraction pattern of the film as it was deposited. The peak near 31 degrees is from small grains of tin and the broad peak near 39 degrees is from the tin-molybdenum matrix phase. The vertical line at 40.6 degrees marks the position expected for pure crystalline molybdenum.

FIG. 8(b) shows the x-ray diffraction pattern of the film in the charged state after the completion of one full charge-discharge cycle. The peak from the matrix phase is similar in position and width to that of the uncycled film. The solid smooth line is a calculated pattern for LiSn, calculated using the crystal structure disclosed in Z. Naturforsch 28B, pp. 246–248 (1973) and assuming grain sizes of 5 nm.

FIG. 8(c) shows the x-ray diffraction pattern of the film in the charged state after the completion of four full charge-discharge cycles. Peaks for tin and for the matrix phase are again observed, demonstrating that the microstructure of the film is substantially maintained during cycling.

FIG. 8(d) shows the x-ray diffraction pattern of the film in the charged state after the completion of ten full charge-discharge cycles. The electrode has begun to crack from the copper substrate, as shown by x-ray peaks attributable to the molybdenum pre-layer and the copper substrate (peak having a tail at 50 degrees). Nevertheless, -comparing the results with the data in FIG. 8(c), and noting the change in intensity scale between the two figures, it can be seen that the tin peak has substantially the same intensity and half-width as the film after four cycles. The same can be said for the peak attributable to the matrix phase, although the results are somewhat obscured by the presence of a peak attributable to the molybdenum pre-layer.

Example 3

A film containing 54.5 wt. % tin and 45.5 wt. % molybdenum was prepared by sputter deposition under the conditions shown in Table I. The tin was sputter deposited at a rate of 110 angstroms/minute, while the molybdenum was sputter deposited at a rate of 60 angstroms/minute. The film contained 62.6 vol. % tin and 37.4 vol. % molybdenum, calculated based upon these sputter rates. The film thickness was 4.1 micrometers and the film density was approximately 9.2 g/cm$^3$. The film had a pre-layer of pure molybdenum measuring approximately 200 angstroms thick and a post-layer of pure tin measuring approximately 500 angstroms thick.

TEM analysis of the film prior to cycling did not detect the presence of any crystalline regions. Electron diffraction patterns showed only broad diffuse rings. If crystallinity of any form existed, it was on a scale of less than 10 angstroms. In addition, x-ray microanalysis indicated that no composition modulation could be measured on a 1.6 nm scale (the size of the probe). After one full cycle, crystalline regions of LiSn appeared.

Figure 2A:
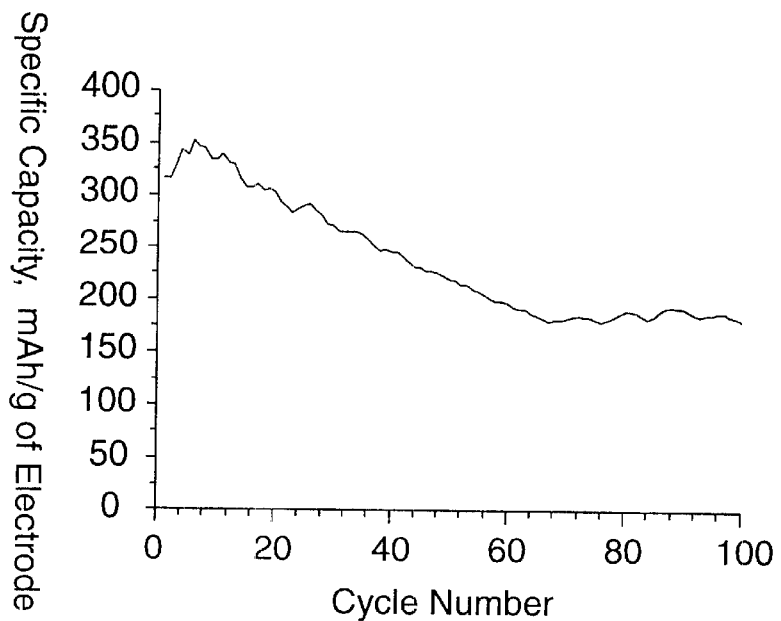
FIG. 2 illustrates the cycling performance, in terms of reversible specific capacity (top graph) and coulombic efficiency (bottom graph), of a sputter-deposited tin-molybdenum electrode having 54.5 wt. % tin and 45.5 wt. % molybdenum.
Figure 2B:
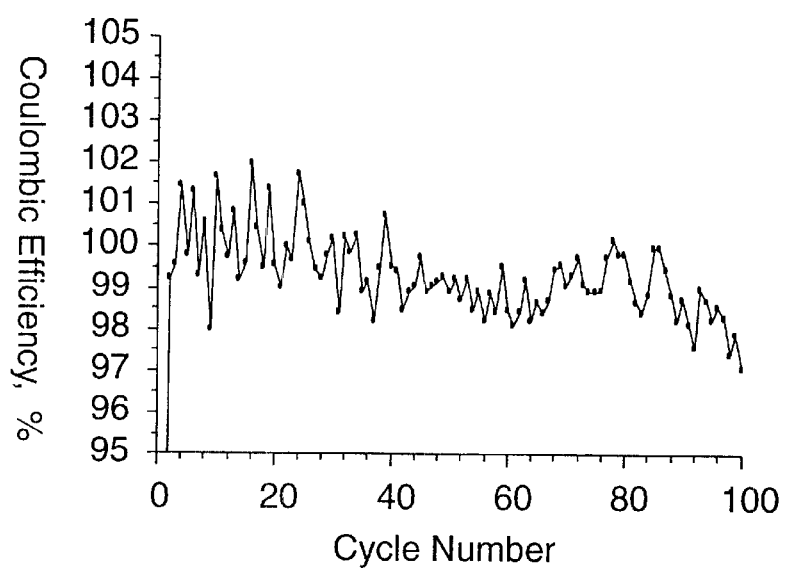

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.5 mA/cm$^2$ and cutoff voltages of 5 mV and 1.4 V. The specific capacity and coulombic efficiency of the cell in shown in FIG. 2. The results demonstrate that the sputtered tin-molybdenum film, which was sputtered at lower tin and molybdenum rates compared to Example 2, exhibited a reversible capacity of approximately 300 mAh/g for at least 50 cycles and a coulombic efficiency of approximately 99.0%.

Example 4

A film containing 45 wt. % tin and 55 wt. % molybdenum was prepared by sputter deposition under the conditions shown in Table I. The tin was sputter deposited at a rate of 555 angstroms/minute, while the molybdenum was sputter deposited at a rate of 487 angstroms/minute. The film contained 53.3 vol. % tin and 46.7 vol. % molybdenum, calculated based upon these sputter rates. The film thickness was 5.6 micrometers and the film density was approximately 9.2 g/cm$^3$. The film had a pre-layer of pure molybdenum measuring approximately 1000 angstroms thick and a post-layer of pure tin measuring approximately 2500 angstroms thick.

Figure 3A:
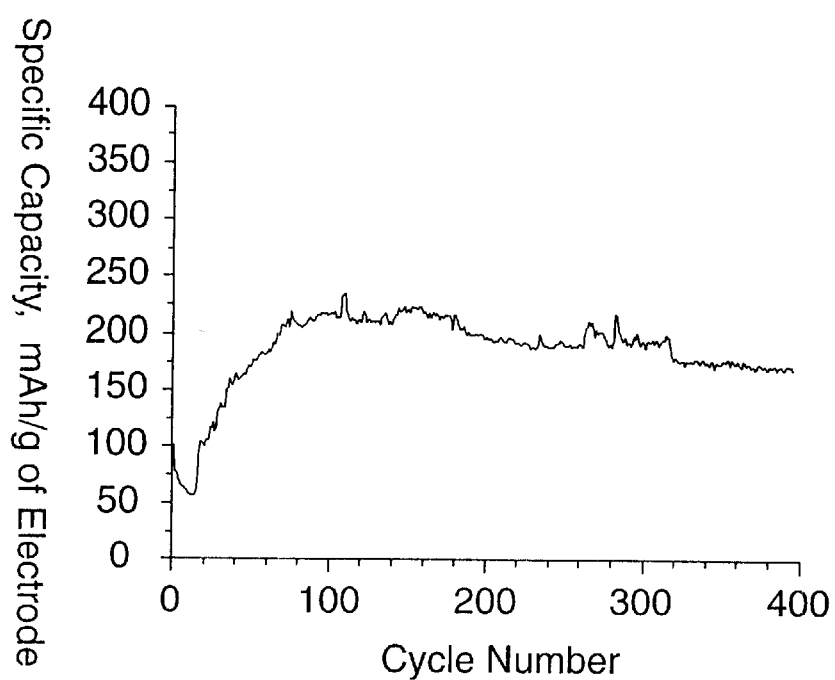
FIG. 3 illustrates the cycling performance, in terms of reversible specific capacity (top graph) and coulombic efficiency (bottom graph), of a sputter-deposited tin-molybdenum electrode having 45 wt. % tin and 55 wt. % molybdenum.
Figure 3B:
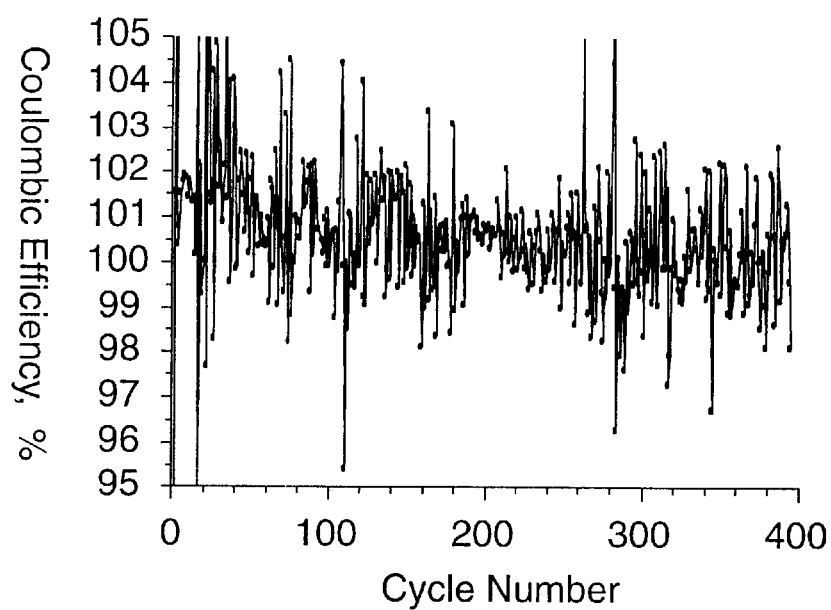

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.5 mA/cm$^2$ and cutoff voltages of 5 mV and 1.4 V. The specific capacity and coulombic efficiency of the cell in shown in FIG. 3. The results demonstrate the sputtered tin-molybdenum film, in which the wt. % of molybdenum was higher than the film of Example 2, exhibited a reversible capacity of approximately 200 mAh/g and a coulombic efficiency of approximately 99.0% for at least 400 cycles. Comparing these results with the results of Example 2 demonstrates that as the wt. % of molybdenum increases, the specific capacity decreases, but the cycle life (defined by the number of cycles at 99.0% coulombic efficiency) increases.

Example 5

A film containing 65.5 wt. % tin and 34.5 wt. % niobium was prepared by sputter deposition under the conditions shown in Table I. The tin was sputter deposited at a rate of 555 angstroms/minute, while the niobium was sputter deposited at a rate of 250 angstroms/minute. The film contained 69 vol. % tin and 31 vol. % niobium, calculated based upon these sputter rates. The film thickness was 4.8 micrometers and the film density was approximately 8.6 g/cm$^3$. The film had a pre-layer of pure niobium measuring approximately 500 angstroms thick and a post-layer of pure tin measuring approximately 2500 angstroms thick.

TEM analysis of the film prior to cycling revealed that the microstructure of the film included crystalline particles (present in TEM micrographs as dark cigar-shaped regions) in a compositionally modulated matrix phase (present in TEM micrographs as striped regions). X-ray microanalysis demonstrated that the crystalline particles were tin-rich relative to the bulk composition. Bulk "white" regions interspersed between the striped regions were revealed by x-ray microanalysis to be niobium-rich relative to the bulk composition.

Electron diffraction patterns also indicated the presence of a two phase microstructure:crystalline tin and a matrix phase characterized by a broad diffuse ring pattern, suggesting the absence of crystalline material. High resolution electron microscopy verified that the matrix phase was amorphous on a 10 angstrom scale.

TEM analysis of the radially cut samples showed that the measured average crystalline particle size was 5±1.8 nm by 33±8.0 nm. The measured range of particle sizes was from 3×20 nm (smallest) to 6×42 nm (largest). The crystalline particles had aspect ratios ranging from approximately 3:1 to 10:1, with the long dimension parallel to the plane of the film.

TEM analysis of the perpendicularly cut samples showed that the measured average crystalline particle size was 8±1.8 nm by 44±12.4 nm. The measured range of particle sizes was from 6×26 nm (smallest) to 5×80 nm (largest). The tin particles had aspect ratios ranging from approximately 1.1:1 to 15:1.

TEM analysis of the matrix phase revealed this phase to be compositionally modulated perpendicular to the plane of the film, as evidenced by wandering "stripes" in the TEM images. X-ray microanalysis of the matrix phase confirmed the presence of a compositionally modulated structure. The x-ray data was obtained using a TEM probe size of 1.6 nm moved along steps adjacent to a crystalline particle in a direction normal to the plane of the film. The compositional results were determined using a standardless quantitative analysis routine, and are shown in Table IV. As shown in Table IV, the matrix showed compositional modulation. For comparison, the average bulk composition, determined using a 100 nm probe, was 58.9 wt. % tin and 41.1 wt. % niobium.

TABLE IV

| Sample | Wt. % Sn | Wt. % Nb |
|---|---|---|
| cryst. particle | 73.73 | 26.27 |
| cryst. particle | 82.21 | 17.79 |
| adj. x1 | 67.35 | 32.65 |
| adj. x2 | 62.56 | 37.44 |
| adj. x3 | 53.56 | 46.44 |
| adj. x4 | 63.08 | 36.92 |
| adj. x5 | 65.62 | 34.38 |
| adj. x6 (white region) | 55.18 | 44.82 |
| adj. x7 (white region) | 54.09 | 45.91 |

Figure 4A:
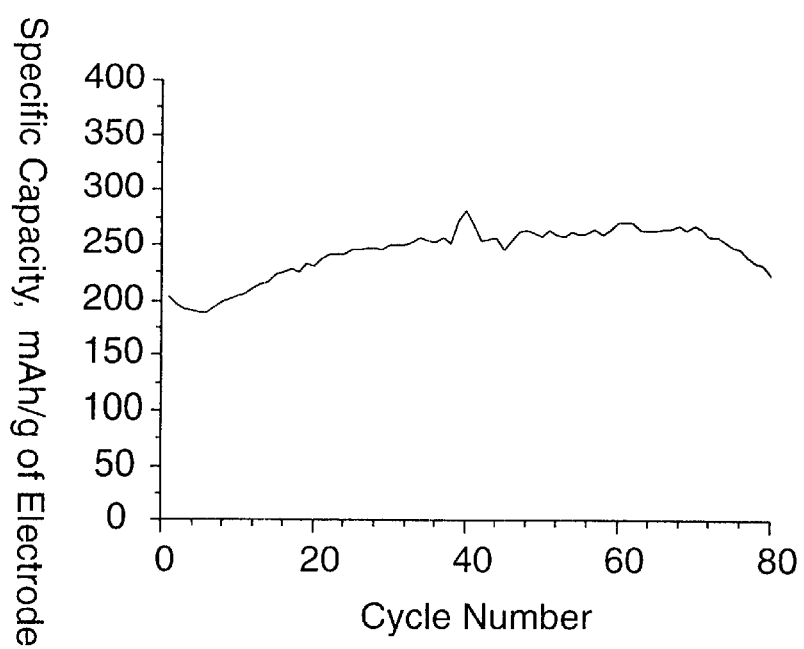
FIG. 4 illustrates the cycling performance, in terms of reversible specific capacity (top graph) and coulombic efficiency (bottom graph), of a sputter-deposited tin-niobium electrode having 65.5 wt. % tin and 34.5 wt. % niobium.
Figure 4B:
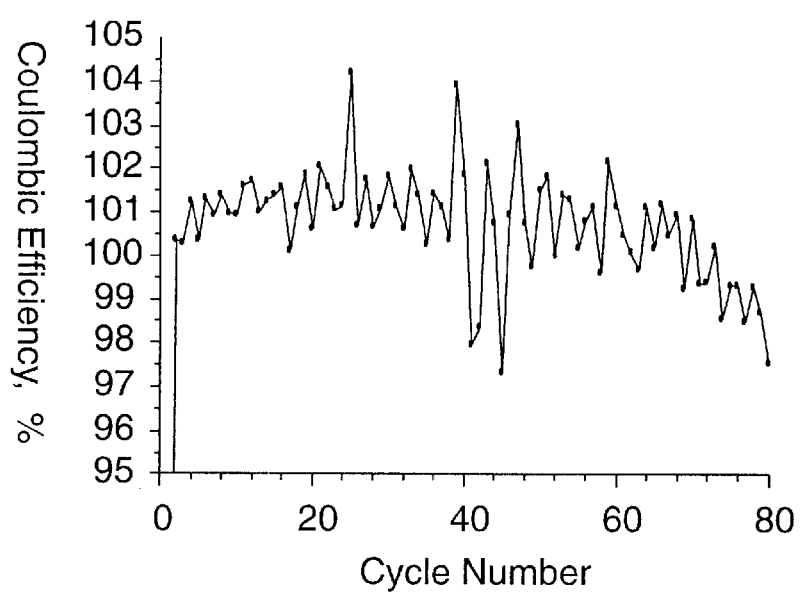

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.5 mA/cm$^2$ and cutoff voltages of 5 mV and 1.4 V. The specific capacity and coulombic efficiency of the cell in shown in FIG. 4. The results demonstrate that films using niobium as the non-electrochemically active metal element exhibit a reversible capacity of 225 mAh/g and a coulombic efficiency greater than 99.0% for at least 70 cycles.

Example 6

A film containing 43.7 wt. % tin and 56.3 wt. % tungsten was prepared by sputter deposition under the conditions shown in Table I. The tin was sputter deposited at a rate of 560 angstroms/minute, while the tungsten was sputter deposited at a rate of 275 angstroms/minute. The film contained 67.3 vol. % tin and 32.7 vol. % tungsten, calculated based upon these sputter rates. The film thickness was 8.8 micrometers and the film density was approximately 6 g/cm$^3$. The film had a pre-layer of pure tungsten measuring approximately 680 angstroms thick and a post-layer of pure tin measuring approximately 2800 angstroms thick.

Figure 6A:
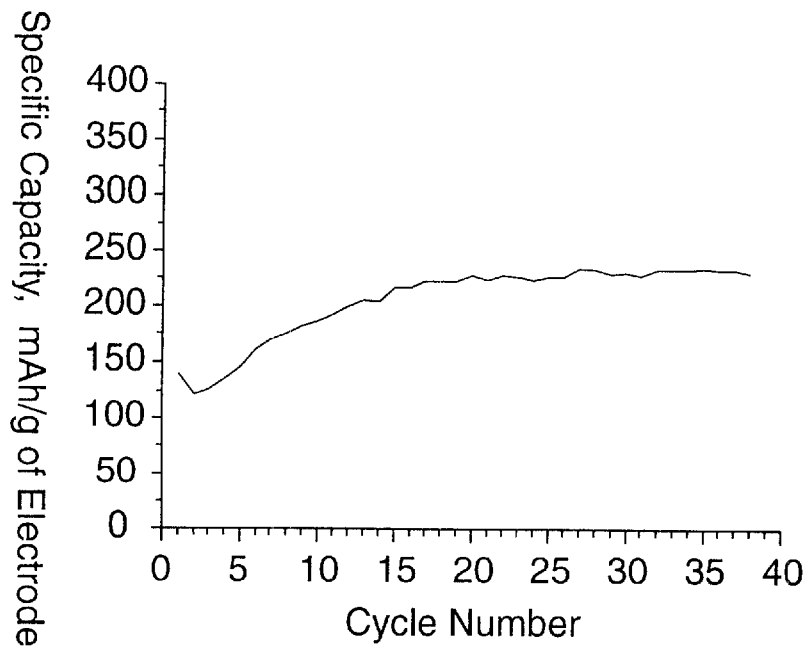
FIG. 6 illustrates the cycling performance, in terms of reversible specific capacity (top graph) and coulombic efficiency (bottom graph), of a sputter-deposited tin-tungsten electrode having 43.7 wt. % tin and 56.3 wt. % tungsten.
Figure 6B:
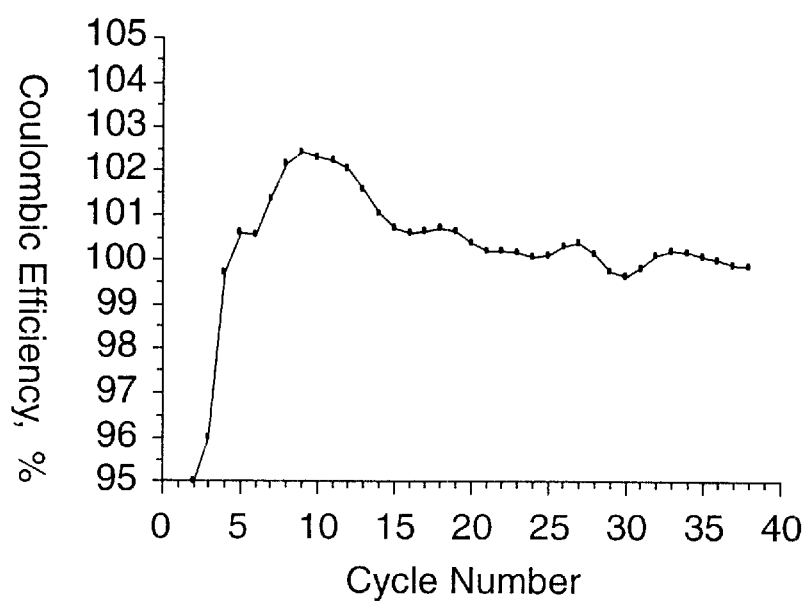

The cycling behavior of the electrode film was tested as described above using a coin cell featuring a lithium foil anode and the sputtered film as the cathode. The first discharge or lithiation of the film was controlled by setting the cycling conditions to taper the current at 5 mV so that the cell was lithiated to at least 400 mAh/g. The cell was then placed under charge and discharge cycling conditions using a current of 0.25 mA/cm$^2$ and cutoff voltages of 5 mV and 1.4 V. The specific capacity and coulombic efficiency of the cell in shown in FIG. 6. The results demonstrate the sputtered film, in which the non-electrochemically active metal element was tungsten, exhibited a reversible capacity of approximately 200 mAh/g and a coulombic efficiency of approximately 99.0% for at least 40 cycles.

Example 7

A film containing 62 wt. % tin and 38 wt. % molybdenum was prepared by sputter deposition under the conditions shown in Table I. The tin was sputter deposited at a rate of 780 angstroms/minute, while the molybdenum was sputter deposited at a rate of 340 angstroms/minute. The film contained 69 vol. % tin and 31 vol. % molybdenum, calculated based upon these sputter rates. The film thickness was 5.1 micrometers and the film density was approximately 9.9 g/cm$^3$. The film had a pre-layer of pure molybdenum measuring approximately 700 angstroms thick. It did not have a post-layer.

B. Electrode Compositions Prepared by Ball Milling

Electrode compositions were prepared by ball milling and, in some instances, characterized according to the following general procedures.

Ball Milling Procedure

A Spex 8000 high-impact mixer mill was used to violently shake sealed hardened steel vials for periods up to 40 hours. In an argon-filled glove box, the desired amounts of elemental powders or intermetallic compounds were added to a hardened steel vial, along with several hardened steel balls measuring 12.7 mm in diameter. The vial was then sealed and transferred to a Spex 8000 high-impact mixer mill where it was shaken violently. Milling times were generally on the order of about 20 hours.

Cycling Behavior

Electrodes were prepared by coating slurries of the powders onto a copper foil and then evaporating the carrier solvent. Specifically, about 86% by weight powder (prepared by ball milling), 8% by weight Super S carbon black (MMM Carbon, Belgium), and 6% by weight polyvinylidene fluoride (Atochem) were thoroughly mixed with N-methyl pyrrolidinone by stirring in a sealed bottle to make a slurry; the polyvinylidene fluoride was pre-dissolved in the N-methyl pyrrolidinone prior to addition of the powder and carbon black. The slurry was spread in a thin layer (about 150 micrometers thick) on the copper foil with a doctor-blade spreader. The sample was then placed in a muffle oven maintained at 105° C. to evaporate the N-methyl pyrrolidinone solvent over a 3 hour period.

Circular electrodes measuring 1 cm in diameter were cut from the dried film using an electrode punch. The electrodes were weighed, after which the weight of the copper was subtracted and the active mass of the electrode calculated (i.e., the total weight of the electrode multiplied by the fraction of the electrode made of the active electrode powder).

The electrodes were used to prepare coin cells for testing. A lithium foil having a thickness of 125 micrometers functioned as the anode and reference electrode. The cell featured 2325 hardware, equipped with a spacer plate (304 stainless steel) and a disc spring (mild steel). The disc spring was selected so that a pressure of about 15 bar would be applied to each of the cell electrodes when the cell was crimped closed. The separator was a Celgard #2502 microporous polypropylene film (Hoechst-Celanese) which had been wetted with a 1M solution of LiPF$_6$ dissolved in a 30:70 volume mixture of ethylene carbonate and diethyl carbonate (Mitsubishi Chemical). Cycling conditions were typically set at a constant current of 37 mA/g of active material. Cutoff voltages of 0.0 V and 1.3 V were used.

X-Ray Diffraction

Powder x-ray diffraction patterns were collected using a Siemens D5000 diffractometer equipped with a copper target x-ray tube and a diffracted beam monochromator. Data was collected between scattering angles of 10 degrees and 80 degrees.

To examine the electrode materials during cycling, in-situ x-ray diffraction experiments were performed. Cells for in-situ x-ray diffraction were assembled as described above in the case of the cycling experiment with the following differences. The coin cell can was provided with a circular hole measuring 18 mm in diameter. A 21 mm diameter beryllium window (thickness=250 micrometers) was affixed to the inside of the hole using a pressure sensitive adhesive (Roscobond from Rosco of Port Chester, N.Y.). The electrode material was coated directly onto the window before it was attached to the can.

The cell was mounted in a Siemens D5000 diffractometer and slowly discharged and charged while x-ray diffraction scans were taken continuously. Typically, a complete scan took 2–5 hours and the discharge and charge time took 40–60 hours, giving approximately 10–30 "snapshots" of the crystal structure of the electrode as a function of its state of charge. The voltage of the cell was continuously monitored during cycling.

Specific samples were prepared and tested as follows.

Example 8

An intermetallic compound, $Sn_2Fe$, was prepared by melting together stoichiometric ratios of tin and iron (obtained in powder form from Aldrich Co. of Milwaukee, Wis.) in a radio frequency induction furnace under inert gas. After a homogeneous melt was obtained, the sample was removed from the furnace, transferred to a tube furnace, and annealed at 500° C. for about 60 hours under argon flow. The sample was then broken into chunks with a hammer, after which 2 grams of the sample was placed into a hardened steel vial, along with two 12.7 mm diameter hardened steel balls, and the vial sealed. The loading and sealing were conducted in an argon-filled glove box. The sample was then milled for 20 hours following the general procedure described above. The sample contained 66.6 atomic % tin and 33.3 atomic % iron.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Three samples were tested.

Example 9

A ball milled powder was prepared according to the procedure of Example 8 except that before being placed in the steel vial, the sample was ground using a mortar and pestle to form 50 micron-sized particles. Following milling, an electrochemical cell was constructed as described above and its cycling behavior tested. The irreversible capacity (in mAh/g up to 1.3 V) and reversible capacity (mAh/g) are reported in Table V. Cycle life was not tested ("NT").

Example 10

A ball milled powder was prepared according to the procedure of Example 8 except that the powder was prepared by adding 0.402 g iron, 1.715 g tin, and 0.026 g graphite powder (mesocarbon microbeads from Osaka Gas Ltd. which had been heated to 2650° C.) directly to the milling vial. The sample contained 60.6 atomic % tin, 30.3 atomic % iron, and 9.1 atomic % carbon. X-ray diffraction data suggests that the sample contains a mixture of an $Sn_2Fe$ phase and a carbon phase.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V.

To study the reaction of $Sn_2Fe$ with lithium during cycling, two in-situ x-ray diffraction cells were constructed. The first had an active electrode made of tin metal powder, while the second had an active electrode made of the above-described electrode powder. The x-ray diffraction patterns of both electrodes were observed after the cell had been discharged to zero volts over a period of about 40 hours. The results are shown in FIG. 9. The broad diffraction peak near 23° and the sharper peak near 38.5° arise from the active electrode which has reacted with lithium. The other peaks are attributable to the beryllium window of the cell and from small amounts of inactive electrode material. The similarity between the patterns suggests that the discharge products of Li/Sn and Li/$Sn_2$Fe are similar. This suggests the presence of a crystalline Li-Sn alloy phase with nanometer-scale crystallite size and a second, iron-rich, crystalline phase in which the size of the crystallites is also on a nanometer scale.

Example 11

A ball milled powder was prepared according to the procedure of Example 8 except the powder was prepared by adding 0.404 g iron, 1.711 g tin, and 0.066 g graphite powder (mesocarbon microbeads from Osaka Gas Ltd. which had been heated to 2650° C.) directly to the milling vial. The sample contained 54.1 atomic % tin, 27.0 atomic % iron, and 18.9 atomic % carbon. X-ray diffraction data suggests that the sample contains a mixture of an $Sn_2Fe$ phase and a carbon phase.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested. The cycle life of the second sample was not tested ("NT").

Example 12

A ball milled powder was prepared according to the procedure of Example 8 except the powder was prepared by adding 0.406 g iron, 1.725 g tin, and 0.104 g graphite powder (mesocarbon microbeads from Osaka Gas Ltd. which had been heated to 2650° C.) directly to the milling vial. The sample contained 47.6 atomic % tin, 23.8 atomic % iron, and 28.6 atomic % carbon. X-ray diffraction data suggests that the sample contains a mixture of an $Sn_2Fe$ phase and a carbon phase.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested. The cycle life of the first sample was not tested ("NT").

Example 13

A ball milled powder was prepared according to the procedure of Example 8 except the relative amounts of iron and tin were selected to yield a sample having 50.0 atomic % tin and 50.0 atomic % iron. In addition, iron and tin were adding directly to the milling vial, rather than being melted together. Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V.

Example 14

A ball milled powder was prepared according to the procedure of Example 8 except the relative amounts of iron and tin were selected to yield a sample having 40.0 atomic % tin and 60.0 atomic % iron. In addition, the sample was milled for 38 hours. Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested.

Example 15

A ball milled powder was prepared according to the procedure of Example 8 except the relative amounts of iron and tin were selected to yield a sample having 37.5 atomic % tin and 62.5 atomic % iron. In addition, the sample was milled for 19 hours. Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested.

Example 16

A ball milled powder was prepared according to the procedure of Example 8 except the powder was prepared by adding 0.866 g iron, 1.277 g tin, and 0.049 g graphite powder (mesocarbon microbeads from Osaka Gas Ltd. which had been heated to 2650° C.) directly to the milling vial. The sample contained 35.4 atomic % tin, 51.2 atomic % iron, and 13.4 atomic % carbon. X-ray diffraction revealed the sample to be a mixture of $Sn_2Fe$ and $SnFe_3C$ phases.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested.

Example 17

A ball milled powder was prepared according to the procedure of Example 8 except the powder was prepared by adding 0.866 g iron, 1.277 g tin, and 0.136 g graphite powder (mesocarbon microbeads from Osaka Gas Ltd. which had been heated to 2650° C.) directly to the milling vial. The sample contained 28.7 atomic % tin, 41.6 atomic % iron, and 29.7 atomic % carbon. X-ray diffraction revealed the sample to be a mixture of $Sn_2Fe$ and $SnFe_3C$ phases.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested. The cycle life of the first sample was not tested ("NT").

Example 18

A ball milled powder was prepared according to the procedure of Example 8 except the powder was prepared by adding 1.017 g iron, 1.083 g tin, and 0.066 g graphite powder (mesocarbon microbeads from Osaka Gas Ltd. which had been heated to 2650° C.) directly to the milling vial. The sample contained 27.8 atomic % tin, 55.6 atomic % iron, and 16.7 atomic % carbon. X-ray diffraction revealed the sample to be a mixture of $Sn_2Fe$ and $SnFe_3C$ phases.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V.

Example 19

A ball milled powder was prepared according to the procedure of Example 8 except the powder was prepared by adding 1.044 g iron, 1.070 g tin, and 0.164 g graphite powder (mesocarbon microbeads from Osaka Gas Ltd. which had been heated to 2650° C.) directly to the milling vial. The sample contained 22.1 atomic % tin, 44.2 atomic % iron, and 33.6 atomic % carbon. X-ray diffraction revealed the sample to be a mixture of $Sn_2Fe$ and $SnFe_3C$ phases.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V. Two samples were tested.

Example 20

A ball milled powder was prepared according to the procedure of Example 8 except the powder was prepared by adding 1.160 g iron, 1.823 g tin, and 0.084 g graphite powder (mesocarbon microbeads from Osaka Gas Ltd. which had been heated to 2650° C.) directly to the milling vial. The sample contained 20.0 atomic % tin, 60.0 atomic % iron, and 20.0 atomic % carbon. X-ray diffraction revealed the sample to be a mixture of $Sn_2Fe$ and $SnFe_3C$ phases.

Following milling, an electrochemical cell was constructed as described above and its cycling behavior tested. The irreversible capacity (in mAh/g up to 1.3 V), reversible capacity (mAh/g), and cycle life before the capacity fell to 50% of the initial reversible capacity at C/10 are reported in Table V.

TABLE V

| Examples | Irrev. Capacity | Rev. Capacity | Cycle Life |
| --- | --- | --- | --- |
| 8 | 164 | 607 | 12 |
|  | 173 | 619 | 10 |
|  | 177 | 618 | 10 |
| 9 | 96 | 548 | NT |
| 10 | 120 | 635 | 13 |
| 11 | 100 | 635 | 10 |
|  | 108 | 657 | NT |
| 12 | 89 | 646 | NT |
|  | 90 | 646 | 11 |
| 13 | 66 | 328 | 33 |
| 14 | 83 | 193 | >50 |
|  | 83 | 195 | >50 |
| 15 | 64 | 156 | 65 |
|  | 60 | 143 | 65 |
| 16 | 61 | 340 | 37 |
|  | 56 | 343 | 33 |
| 17 | 63 | 358 | NT |
|  | 59 | 356 | 43 |
| 18 | 59 | 226 | 80 |
| 19 | 66 | 193 | 130 |
|  | 60 | 216 | 130 |
| 20 | 50 | 62 (increases to 100) | >200 |

Other embodiments are within the following claims.

What is claimed is:

1. A method of preparing an electrode composition comprising combining (a) a source comprising an electrochemically active metal element and (b) a source comprising a non-electrochemically active metal element to form an electrode composition according to a process selected from the group consisting of sputtering, ball milling, chemical vapor deposition, melt spinning, splat cooling, vacuum evaporation, spray atomization, and combinations thereof, said electrode composition characterized in that:
   (i) prior to cycling said electrochemically active metal element is in the form of an intermetallic compound or an element metal;
   (ii) when incorporated in a lithium battery and cycled through one full charge-discharge cycle, said electrode composition comprises crystalline regions and
   (iii) when incorporated in a lithium battery and cycled to realize about 100 mAh/g of said composition, said electrode composition exhibits a coulombic efficiency of at least about 99.0 % after 100 full discharge cycles.

2. A method according to claim 1 comprising combining said sources by sequentially sputter-depositing said source of said electrochemically active metal element and said source of said non-electrochemically active metal element on a substrate to form said electrode composition .

3. A method according to claim 1 comprising combining said sources by ball milling to form said electrode composition.

4. A method according to claim 1 comprising combining said sources by chemical vapor deposition to form said electrode composition.

5. A method according to claim 1 comprising combining said sources by melt spinning to form said electrode composition.

6. A method according to claim 1 comprising combining said sources by splat cooling to form said electrode composition.

7. A method according to claim 1 comprising combining said sources by vacuum evaporation to form said electrode composition.

8. A method according to claim 1 comprising combining said sources by spray atomization to form said electrode composition.

9. A method according to claim 1 wherein said electrode composition has a microstructure characterized by one of (i) a single phase that includes said electrochemically active metal element and said non-electrochemically active metal element, (ii) a first phase that includes said electrochemically active metal element and a second phase that includes said non-electrochemically active metal element in which said first and second phases share a common phase boundary, or (iii) a combination thereof; and wherein said crystalline regions have at least one dimension that is no greater than about 500 angstroms and that does not substantially increase after a total of at least 10 cycles.

10. A method of preparing an electrode composition comprising combining (a) a source comprising an electrochemically active metal element and (b) a source comprising a non-electrochemically active metal element to form an electrode composition characterized in that:
   (1) prior to cycling said electrochemically active metal element is in the form of an intermetallic compound or an element metal;
   (2) when incorporated in a lithium battery and cycled through one full charge-discharge cycle, said electrode composition comprises crystalline regions having at least one dimension that is no greater than about 500 angstroms and that does not substantially increase after a total of at least 10 cycles;
   (3) when incorporated in a lithium battery and cycled to realize about 100mAh/g of said composition, said electrode composition exhibits a coulombic efficiency of at least about 99.0 % after 100 full discharge cycles; and
   (4) said electrode composition has a microstructure characterized by one of (i) a single phase that includes said electrochemically active metal element and said non-electrochemically active metal element, (ii) a first phase that includes said electrochemically active metal element and a second phase that includes said non-electrochemically active metal element in which said first and second phases share a common phase boundary, or (iii) a combination thereof.

11. A method according to claim 10 comprising combining said sources by sequentially sputter-depositing said source of said electrochemically active metal element and said source of said non-electrochemically active metal element on a substrate to form said electrode composition.

12. A method according to claim 10 comprising combining said sources by ball milling to form said electrode composition.

13. A method according to claim 10 comprising combining said sources by chemical vapor deposition to form said electrode composition.

14. A method according to claim 10 comprising combining said sources by melt spinning to form said electrode composition.

15. A method according to claim 10 comprising combining said sources by splat cooling to form said electrode composition.

16. A method according to claim 10 comprising combining said sources by vacuum evaporation to form said electrode composition.

17. A method according to claim 10 comprising combining said sources by spray atomization to form said electrode composition.

* * * * *

UNITED STATES PATENT AND TRADEMARK OFFICE
CERTIFICATE OF CORRECTION

PATENT NO.   : 6,436,578 B2
DATED        : August 20, 2002
INVENTOR(S)  : Turner, Robert L.

It is certified that error appears in the above-identified patent and that said Letters Patent is hereby corrected as shown below:

Title page,
Item [75], Inventors, delete "CA" and insert -- Nova Scotia, Canada -- therefor.
Item [56], References Cited, U.S. PATENT DOCUMENTS, delete "1998" and insert -- 1996 -- therefor; and delete "1999" and insert -- 1997 -- therefor.
FOREIGN PATENT DOCUMENTS, delete "2134053" and insert -- 2134052 -- therefor.
OTHER PUBLICATIONS, delete "Basenhard" and insert -- Besenhard -- therefor.

Column 13,
Line 4, delete "-" preceding "comparing".

Column 14,
Line 40, delete "microstructure:crystalline" and insert -- microstructure: crystalline -- therefor.

Column 21,
Line 13, delete "element" and insert -- elemental -- therefor.

Column 22,
Line 8, delete "element" and insert -- elemental -- therefor.

Signed and Sealed this

Sixth Day of September, 2005

JON W. DUDAS
*Director of the United States Patent and Trademark Office*